United States Patent [19]

Chevalier-Bultel et al.

[11] Patent Number: 4,476,235

[45] Date of Patent: Oct. 9, 1984

[54] GREEN MOLDED PRODUCT CONTAINING ASBESTOS TAILINGS SUITABLE FOR FIRING

[75] Inventors: Jean-Pierre Chevalier-Bultel; Jean-Pierre Drolet, both of Sherbrooke, Canada

[73] Assignee: Societe Nationale de Liamiante, Quebec, Canada

[21] Appl. No.: 444,333

[22] Filed: Nov. 24, 1982

[51] Int. Cl.$^3$ .............................................. C04B 35/04
[52] U.S. Cl. ..................... 501/112; 501/118; 501/119; 501/127; 501/131; 501/141; 501/153; 501/155
[58] Field of Search ............... 501/112, 118, 119, 127, 501/131, 141, 153, 155

[56] References Cited

U.S. PATENT DOCUMENTS

| | | | |
|---|---|---|---|
| 631,719 | 8/1899 | Imschenetzky | 501/122 |
| 2,396,246 | 3/1946 | Callis | 501/125 |
| 2,543,752 | 3/1951 | Austin | 501/121 |
| 3,775,141 | 11/1973 | Weldman | 501/95 |
| 4,287,167 | 9/1981 | Aitcin | 501/112 |
| 4,320,022 | 3/1982 | Aitcin | 501/112 |

FOREIGN PATENT DOCUMENTS

| | | | |
|---|---|---|---|
| 2398704 | 3/1979 | France | 501/155 |
| 688477 | 10/1979 | U.S.S.R. | 501/155 |

*Primary Examiner*—Mark Bell
*Attorney, Agent, or Firm*—Cushman, Darby & Cushman

[57] ABSTRACT

There is disclosed a green moulded product suitable for preparing shaped fired units comprising (a) at least 55% to 99% by weight of non-calcined asbestos tailings, the remainder comprising (b) at least one of (i) a heat decomposable metal salt selected from sodium, potassium, lithium, calcium, barium, magnesium, aluminum and mixtures thereof in an amount of from 1% to 15% by weight, (ii) a natural aluminum silicate in an amount of from 1% to 30% by weight, and (iii) mixtures of (i) and (ii). The properties of fired units are such that they can be used as structural bricks, medium refractory bricks, firebricks, tiles and the like.

9 Claims, No Drawings

GREEN MOLDED PRODUCT CONTAINING ASBESTOS TAILINGS SUITABLE FOR FIRING

INTRODUCTION

The present invention relates to a green moulded product and to a shaped fired unit obtained therefrom using asbestos tailings as the major ingredient. The properties of the resulting units are such that they can be used for making structural bricks, medium refractory bricks, firebricks, tiles and the like. The exposed surfaces of the green units can also be glazed or engobed before firing to improve decorative effects.

BACKGROUND OF THE INVENTION

In the structural clay and refractory industries capable of mass production, ceramic units are either made by the extrusion or the pressing process. Extrusion is preferred when dealing with plastic raw materials, whereas pressing is rather used to agglomerate non-plastic materials. The process in making these products consists in quarrying the clay, milling and grinding the same. Then, the clay is cleared of stones and extruded in pug mills. When using non-plastic clays, plasticizers can be added to the mixture before extrusion, or the shaped units can be made by pressing. The resulting units are dried and finally fired. As the temperature of firing increases beyond red heat, vitrification occurs.

Vitrification is the hardening, tightening and finally the partial fusing of clay. Clays vitrify at various temperatures depending upon their composition. A common red clay, for example, which as a high iron content and other mineral impurities, may be fired to hardness and density at about 1000° C. and may melt to a liquid at about 1250° C. More refractory clays fire somewhere between 1000° and 1250° C. A well-fired piece of clay is characterized by hardness, great compressive strength, high density, impermeability and by a very large and easily controlled variety of color and texture which is reminiscent of the variety in the earthy materials of the landscape. When the compressive strength is higher than 20 MPA, and water absorption lower than 18%, the units can be used as building blocks. If water absorption is lower than 5%, the units can be used as quarry or paver tiles, according to the American specification ANSI A1-37, 1-1980 or the Canadian equivalent specification CAN2-75.1-M77.

It is also known that serpentine, more particularly chrysotile asbestos tailings, contains the constituents of olivine, that is magnesium oxide, silicon dioxide and ferric oxide, though in different proportions. It is also known that there is an enormous amount of chrysotile asbestos tailings and residues in countries where asbestos mining is carried out to a large extent, so that it would appear that great advantages could be derived if a satisfactory method could be found to modify or convert the plentiful asbestos tailings into sintered moulded units, having properties equivalent to commercial ceramic bodies made from clays.

Asbestos tailings have a low commercial value and the appropriate granulometry is already available for pressing. Accordingly, quarrying, milling, grinding and cleaning raw materials which are required for clays, are not required when dealing with asbestos tailings. However, since the tailings are more refractory than clays, they sinter at a much higher temperature.

Accordingly, it would appear highly desirable if asbestos tailings could be sintered at as low a temperature as possible whereby the energy cost would be substantially reduced while still obtaining sintered units of the same quality level as those of standard clay products.

SUMMARY OF THE INVENTION

In accordance with the present invention, there is provided a green moulded product containing from 55 to 99% by weight of asbestos tailings which can be actively sintered between 1100° and 1300° C., in such a way that the resulting sintered units have properties equivalent to and in some case even better than the standard clay products commercially used.

The sintered moulded units of the present invention are characterized by being asbestos-free, by having good compressive strength, low water absorption, and low coefficient of saturation. Furthermore, the fired units of the present invention are such that units are obtained where shrinkage, warpage and wedging can be closely controlled.

The present invention comprises the preparation of green moulded units made up of a compressed mixture of from 55 to 99% by weight of non-calcined asbestos tailings and 45 to 1% by weight of at least one of the following:

(i) from 1 to 15% by weight of a heat decomposable salt of a metal selected from sodium, potassium, lithium, calcium, barium, magnesium and aluminum; or (ii) from 1 to 30% by weight of a natural aluminum silicate; or (iii) a mixture of (i) and (ii) in the respective amounts indicated.

The green moulded units of the present invention are then sintered at a temperature of from 1100° to 1300° C. for a period of from 2 to 4 hours to yield a new fired compacted moulded unit characterized by a water absorption of less than 18%. The fired units are made up of calcined granules of asbestos tailings and a chemical bond binding the granules together. The chemical bond is represented by a mixture of $MOSiO_2$ and $MgO$ wherein MO stands for any of $Na_2O$, $K_2O$, $Li_2O$, $CaO$, $BaO$, $MgO$ and $Al_2O_3$ and mixtures thereof. Finally, the fired units of the present invention possess advantageous physical properties as will be seen later.

These objectives are obtained by making new compacted moulded units comprising a fired mixture of asbestos tailings with a binder which is a heat decomposable salt of a metal selected from sodium, magnesium, lithium, potassium, calcium, barium and aluminum, the amount of binder being from 1 to less than 15% by weight. The binder may also be a natural aluminum silicate in an amount of from 1 to 30% by weight. Also a mixture of a heat decomposable metal salt as defined previously in an amount of 1 to 15% by weight and a natural aluminum silicate in an amount of from 1 to 30% by weight can also be used as the binder. The green units are obtained by compacting the asbestos tailings and the selected binder at a pressure of from 3000 to 5000 psi and then fired at temperatures of from 1100° to 1300° C., for 2 to 4 hours. If desired extrusion under vacuum can also be used to prepare the green moulded units. Uncalcined asbestos tailings taken directly from any asbestos mine are used to make the units of the present invention.

In general, for a given compacting pressure and sintering temperature, the strength obtained on sintered units containing a binder is higher than that obtained without binder, and the water absorption is lower.

It has been found that a wide variety of compositions can be used to make structural bricks, firebricks as well as medium refractory bricks, but for floor tiles and the like, sodium chloride appears to be the best binder to get the required properties.

ADVANTAGES OF THE SINTERED UNITS

The sintered units containing at least 55% asbestos tailings offers many advantages. There are:
1. The cost of uncalcined asbestos tailings containing serpentine is quite competitive with clays since the cost of quarrying, crushing and grinding has already been absorbed in the pricing of the asbestos fibers.
2. The sintered units do not contain asbestos fibers. Indeed, serpentine decomposes during the firing process, losing the water of crystallization at about 700° C. and being transformed into a ceramic body at about 800° C. Forsterite and enstatite are then formed.
3. The decomposition of the uncalcined asbestos tailings during the sintering process creates new surfaces between grains in contact and accelerates the sintering process. This is a remarkable advantage over pre-calcined tailings which are not so active during sintering.
4. Addition of 5 to 8% water is required to make sound green compact with uncalcined tailings. This amount is about twice as low as that required for precalcined tailings.
5. The addition of binder makes the sintering process of uncalcined asbestos tailings very attractive, because they can be sintered to high density at temperatures similar to those used to vitrify clays. Consequently, less energy is required to sinter the mass, furnace linings will have a longer life and maintenance cost for operating such furnaces will be considerably lower than those expected to densify this type of refractory material.
6. Compacting pressures between 3000 and 5000 psi used to make the units are well within the limits of standard presses for mass production.
7. Glazing or engobing compounds can be directly applied to the green unfired units. The compounds adhere very easily to the surface of the units during the sintering and glazes are formed without crazing. Accordingly, glazed tiles can be obtained in a single firing step thus rendering the products of the present invention commercially attractive.
8. Although linear shrinkage takes place during sintering, close tolerance of the sintered moulded units can be maintained.

DETAILED DESCRIPTION

More specifically, the present invention provides novel fired units by mixing asbestos tailings with a metal salt binder and/or a natural aluminum silicate and firing same at temperatures of from 1100° to 1300° C. It has been found that in the sintering process, the asbestos tailings decompose to granules of forsterite and enstatite bonded together at their outside surface by a chemical bond derived from the binder.

ASBESTOS TAILINGS

The asbestos tailings or residues used in the present invention are those normally found next to asbestos mines after the asbestos fibers have been extracted from the mined asbestos rock. In most cases, the particle size is less than about 28 mesh (U.S. standard). If desired the asbestos tailings can be submitted to grinding to reduce the size to from 100 to 400 mesh (U.S. standard).

The asbestos tailings or residues can be used as such. Depending on the color desired in the end product the iron-rich or iron-depleted fraction obtained from a magnetic separation process will be used. When using the iron-rich fraction of asbestos tailings, the color of the end product will vary from dark brown to black. On the other hand when using the iron-depleted fraction of asbestos tailings the color of the end product will vary between various shades of light brown.

The amount of asbestos tailings or residues used in accordance with the present invention will vary from 55 to 99% by weight of the total ingredients used in making up the green moulded product which will be subjected to firing.

BINDER

The binder used in accordance with the present invention is a heat decomposable chloride salt of a metal selected from sodium, potassium, lithium, calcium, barium, aluminum and magnesium or a natural aluminum silicate or a mixture of both.

As heat decomposable metal salt of a metal selected from sodium, potassium, lithium, calcium, barium, magnesium and aluminum there is used the chloride salt. Also there can be used a mixture of heat decomposable salts. The amount of such salt varies from 1 to 15% by weight.

As an example of natural aluminum silicates which can be used in accordance with the present invention there may be mentioned: kaolinite ($Al_2O_3$, $2SiO_2$, $2H_2O$), halloysite ($Al_2O_3$, $2SiO_2$, $4H_2O$), pyrophillite ($Al_2O_3$, $4SiO_2$, $H_2O$), mica ($KAl_3Si_3O_{10}(OH)_2$), potassium feldspath ($K_2O$, $Al_2O_3$, $6SiO_2$), sodium feldspath ($Na_2O$, $Al_2O_3$, $6SiO_2$), nepheline syenite ($0.25K_2O$, $0.75Na_2O$, $1.11Al_2O_3$, $4.65SiO_2$), custer feldspath ($0.69K_2O$, $0.31Na_2O$, $1.05Al_2O_3$, $7.05SiO_2$), sillimanite ($Al_2O_3$, $SiO_2$), spodumene ($Li_2O$, $Al_2O_3$, $4SiO_2$) or petalite ($Li_2O$, $Al_3O_3$, $8SiO_2$).

As natural aluminum silicate there may be also used the aluminum silicate-bearing clays which are well known in the ceramic art. The natural aluminum silicates are used in an amount varying from 1 to 30% by weight.

As binding agent there may also be used a mixture of the above-mentioned heat decomposable metal salts with a natural aluminum silicate. When using such a mixture the amount used in the composition will vary from 1 to 45% by weight.

GREEN MOULDED UNITS

In order to prepare the green moulded units, the heat decomposable binder is dissolved in water and the asbestos tailings or residues are added and mixing is continued until a wet powder is obtained which is then compacted in a double action press at a pressure of from 3000 to 5000 psi. The resulting green compacted units thus obtained are strong enough to be handled or transported on conveyors without cracking. On the other hand, whenever a natural aluminum silicate is used it is first dry mixed with the asbestos tailings and the mixture is wetted with water when the silicate is used as the sole binding agent or an aqueous solution of the heat decomposable metal salt when the binder is to consist of a mixture of natural aluminum silicate and heat decomposable metal salt.

More specifically, for example, to prepare a wet powder mixture containing 3% dry weight of sodium chloride and 97% of asbestos tailings, 3 gr of sodium chloride are dissolved in about 8.5 cc of water and then 97 g of asbestos tailings are added. After thorough mixing the wet powder obtained has a humidity content of from 5 to 8%. The humidity should not be higher than 8% when pressing is used and should be at the lowest possible percentage when extrusion is used in order to avoid loss of binder when a water-soluble binder is used.

FIRING STEP

The green moulded units of the desired shape are strong enough to be handled or transported without crumbling or cracking. The units are then preferably dried at about 110° C. and fired for 2 to 4 hours at temperatures varying between 1100° and 1300° C. The heat cycle can vary from 10 to 12 hours. The time required to arrive at the sintering or firing temperature is about 4 hours, after which the firing or sintering temperature is maintained for a period of 2 to 4 hours, after which the sintered or fired units are permitted to cool for a period of about 4 hours.

The cycle just described is similar to thermal cycles used in standard tunnel kiln operations.

It is also possible to carry out the firing in a reducing or oxidizing atmosphere as is well known in the art. When operating in a reducing atmosphere, the resulting units are stronger than those sintered or fired in an oxidizing atmosphere.

FIRED UNITS

In general, the properties of the fired units prepared in accordance with the present invention will vary with the compacting pressure applied to the green product, the amount of binder used, the particle size distribution of the asbestos tailings used, the sintering temperature and atmosphere. Generally speaking, the fired units of the present invention have the following physical properties within the ranges shown:

| | |
|---|---|
| linear shrinkage | 5 to 13% |
| loss on ignition | 10 to 23% |
| coefficient of saturation | 0 to 0.85% |
| water absorption | 0.05 to 17% |
| compressive strength | 18 to 150 MPA |
| | (2,000 to 22,000 psi) |
| abrasion resistance index | >50 |
| resistance to freezing and thawing | excellent |

The fired units of the present invention are also characterized by being asbestos-free.

MOULDED SHAPES

The products of the present invention can be moulded in the shape of tiles for various industrial uses. For example, ceramic tiles prepared according to the present invention can be used wherever an acid resistant surface is required such as, for example, inside tank linings for the paper industry where the water absorption must be less than 4% and the weight loss less than 8% according to the ASTM C-279 acid test. Suitable floor tiles where the water absorption must be less than 3% can also be prepared in accordance with the present invention.

In another aspect of the present invention, moulded fired units having different physical properties for different uses can be obtained by simply humidifying asbestos tailings, shaping same and firing thus avoiding the use of a binder.

The present invention will be more fully understood by referring to the following Examples which illustrate the invention.

EXAMPLES

The amounts of asbestos tailings and in the size indicated are mixed with a solution containing up to 15% by weight of the selected heat decomposable salt. The total amount of water in the final mixture is about 8%. The wet powder is then compacted in a double action mould at the indicated pressure to provide green cylindrical units having 2" in diameter by 4" high. These units are dried at 110° C. for a period of 24 hours after which they are fired in an intermittent gas furnace at the shown temperature for a soaking time of 4 hours at the maximum temperature.

When using a natural aluminum silicate, it was dry mixed the asbestos tailings and then wetted to provide a mix having from 5 to 8% humidity.

Finally when using a mixture of metal salt and natural aluminum silicate, the latter was dry mixed with the asbestos tailings and then wetted with an aqueous solution containing the metal salt, the amount of water being such as to obtain a final humidity of from 5 to 8% by weight. The respective ingredients, amounts, moulding pressure and firing temperature are shown in the following Examples. Each results shown is computed from an average of 5 samples.

EXAMPLE 1

Results with sodium chloride as binder at different compacting pressure and at a constant temperature.

This example shows the results with sodium chloride as binder on the sintering behaviour of asbestos tailings. The samples are made in the following manner:
  raw material: −28 mesh uncalcined and non demagnetized asbestos tailings
  binder: 0 to 5% of NaCl
  compacting pressure: 3000 to 5000 psi
  sintering temperature and time: 4 h at 1250° C.
  sintering atmosphere: reducing
Results are shown in Table I:

TABLE I

| weight percent of NaCl | L.S. % | L.O.I. % | Ksat % | H$_2$O abs. % | C.S. MPA |
|---|---|---|---|---|---|
| A: compacting pressure: 3000 psi | | | | | |
| 0 | 8.17 | 11.49 | 0.65 | 12.01 | 61.13 |
| 1 | 9.26 | 12.04 | 0.6 | 10.89 | 80.80 |
| 2 | 10.25 | 12.67 | 0.57 | 9.88 | 86.60 |
| 3 | 12.09 | 13.66 | 0.51 | 8.77 | 88.65 |
| 4 | 12.04 | 13.99 | 0.42 | 7.99 | 99.47 |
| 5 | 11.82 | 14.60 | 0.29 | 6.60 | 110.32 |
| B: compacting pressure: 4000 psi | | | | | |
| 0 | 8.98 | 11.08 | 0.56 | 10.34 | 73.08 |
| 1 | 9.32 | 11.60 | 0.46 | 7.80 | 89.43 |
| 2 | 11.60 | 12.32 | 0.35 | 4.90 | 92.54 |
| 3 | 12.08 | 13.25 | 0.22 | 1.95 | 108.33 |
| 4 | 12.03 | 13.45 | 0.29 | 0.63 | 99.43 |
| 5 | 11.11 | 14.27 | 0.27 | 0.94 | 80.10 |
| C: compacting pressure: 5000 psi | | | | | |
| 0 | 9.3 | 10.85 | 0.51 | 9.48 | 99.74 |
| 1 | 9.96 | 11.57 | 0.39 | 6.92 | 112.58 |
| 2 | 11.48 | 12.27 | 0.44 | 2.89 | 147.94 |

TABLE I-continued

| weight percent of NaCl | L.S. % | L.O.I. % | Ksat % | H₂O abs. % | C.S. MPA |
|---|---|---|---|---|---|
| 3 | 12.14 | 12.87 | 0.45 | 1.75 | 132.70 |
| 4 | 11.57 | 13.27 | 0.55 | 0.25 | 144.43 |
| 5 | 10.17 | 13.74 | 0.44 | 0.48 | 124.87 |

L.S.: linear shrinkage
L.O.I.: loss on ignition
Ksat: coefficient of saturation
C.S.: compressive strength

EXAMPLE 2

Results with sodium chloride as binder at different sintering temperature and at a constant pressure.

This example shows the results with sodium chloride as binder on the sintering behaviour of asbestos tailings for a given compacting pressure. The samples are made in the following manner:
- raw material: −28 mesh uncalcined and non demagnetized asbestos tailings
- binder: 0 to 5% NaCl
- compacting pressure: 4000 psi
- sintering time and temperature: 4 h at temperatures of from 1150° to 1300° C.
- sintering atmosphere: reducing Results are shown in Table II:

TABLE II

| weight percent of NaCl | L.S. % | L.O.I. % | Ksat % | H₂O abs. % | C.S. MPA |
|---|---|---|---|---|---|
| A: sintering temperature: 1150° C. | | | | | |
| 0 | 6.08 | 11.02 | 0.77 | 15.23 | 12.07 |
| 1 | 5.99 | 11.14 | 0.72 | 14.17 | 16.7 |
| 2 | 6.50 | 11.72 | 0.70 | 14.09 | 24.87 |
| 3 | 7.34 | 12.91 | 0.66 | 13.5 | 30.32 |
| 4 | 7.16 | 13.02 | 0.60 | 13.21 | 35.50 |
| 5 | 7.62 | 13.82 | 0.60 | 14.06 | 43.61 |
| B: sintering temperature: 1200° C. | | | | | |
| 0 | 7.68 | 10.90 | 0.67 | 12.07 | 46.93 |
| 1 | 8.66 | 11.34 | 0.64 | 11.16 | 55.10 |
| 2 | 9.43 | 11.58 | 0.59 | 10.07 | 81.58 |
| 3 | 9.51 | 12.01 | 0.55 | 9.53 | 93.53 |
| 4 | 10.33 | 12.69 | 0.46 | 9.14 | 105.40 |
| 5 | 10.26 | 13.59 | 0.41 | 9.19 | 87.08 |
| C: sintering temperature: 1250° C. | | | | | |
| 0 | 8.98 | 11.08 | 0.56 | 10.34 | 73.08 |
| 1 | 9.32 | 11.60 | 0.46 | 7.80 | 89.43 |
| 2 | 11.60 | 12.31 | 0.35 | 4.90 | 82.54 |
| 3 | 12.08 | 13.25 | 0.26 | 1.95 | 108.33 |
| 4 | 12.02 | 13.45 | 0.29 | 0.63 | 99.43 |
| 5 | 11.11 | 14.27 | 0.27 | 0.94 | 80.10 |
| D: sintering temperature: 1300° C. | | | | | |
| 0 | 10.79 | 11.36 | 0.68 | 1.39 | 149.66 |
| 1 | 8.78 | 11.83 | 0.62 | 0.81 | 129.5 |
| 2 | 9.81 | 12.40 | 0.47 | 0.66 | 151.66 |
| 3 | 9.25 | 13.08 | 0.17 | 0.42 | 140.20 |
| 4 | 9.69 | 12.77 | 0.38 | 0.17 | 119.27 |
| 5 | 9.62 | 14.30 | 0.43 | 0.86 | 119.53 |

EXAMPLE 3

Results with different types of binders on sintering of asbestos tailings.

These examples show the results of the type of binder on the sintering behaviour of asbestos tailings. The samples are made in the following manner:
- raw material: −28 mesh uncalcined and non demagnetized asbestos tailings
- binder: 4% by weight
- compacting pressure: 4000 psi
- sintering time and temperature: 4 h at 1250° C.
- sintering atmosphere: reducing Results are shown on Table III:

TABLE III

| Type of binder 4% by weight | L.S. % | L.O.I. % | Ksat % | H₂O abs. % | C.S. MPA |
|---|---|---|---|---|---|
| NaCl | 12.02 | 13.45 | 0.29 | 0.63 | 99.43 |
| KCl | 13.15 | 13.27 | 0.33 | 5.33 | 81.96 |
| LiCl | 11.88 | 15.67 | 0.54 | 0.98 | 78.81 |
| MgCl₂.6H₂O | 9.30 | 12.37 | 0.49 | 9.60 | 75.41 |
| CaCl₂ | 10.11 | 14.99 | 0.50 | 1.36 | 98.06 |
| BaCl₂ | 11.68 | 12.04 | 0.34 | 4.15 | 74.49 |
| NaCl/AlCl₃ (ratio, 55/45) | 6.47 | 11.53 | 0.44 | 10.33 | 85.97 |

It appears from these results that better results are obtained from sodium chloride which is also the cheapest of the salts used.

EXAMPLE 4

Results with sodium silicate as binder. The samples are made in the following manner:
- raw material: −28 mesh uncalcined and non demagnetized asbestos tailings
- binder: 3.5% sodium silicate type N.
- compacting pressure: 4500 psi
- sintering time and temperature: 2 h at from 1100° to 1250° C.

Results are shown in Table IV:

TABLE IV

| Temperature °C. | L.S. % | L.O.I. % | Ksat % | H₂O abs. % | C.S. MPA |
|---|---|---|---|---|---|
| 1100 | 6.1 | 11.6 | 0.8 | 16.4 | 14 |
| 1150 | 7.0 | 12.5 | 0.75 | 15 | 18 |
| 1200 | 7.1 | 11.3 | 0.68 | 12.4 | 37 |
| 1250 | 8.5 | 11.8 | 0.57 | 10.5 | 88 |

EXAMPLE 5

Results with a mixed binder comprising 3% NaCl + 4% MgCl₂.6H₂O. The samples are made in the following manner:
- raw material: −28 mesh, uncalcined and non demagnetized asbestos tailings
- binder: 7% (3% NaCl, 4% MgCl₂)
- compacting pressure: 4500 psi
- sintering time and temperature: 2 h at from 1100° to 1250° C.

Results are shown in Table V:

TABLE V

| Temperature °C. | L.S. % | L.O.I. % | Ksat % | H₂O abs. % | C.S. MPA |
|---|---|---|---|---|---|
| 1100 | 6.4 | 15.5 | 0.75 | 16.1 | 18 |
| 1150 | 7.1 | 14.1 | 0.73 | 16.5 | 26 |
| 1200 | 8.8 | 14.0 | 0.66 | 13.2 | 43 |
| 1250 | 10.7 | 14.0 | 0.60 | 9.8 | 100 |

EXAMPLE 6

Results with 14% magnesium chloride as binder. The samples are made in the following manner:
- raw material: −28 mesh uncalcined and non demagnetized
- binder: 14% MgCl₂.6H₂O compacting pressure: 4000 psi
sintering time and temperature: 2 h at from 1100° to 1300° C.
Results are shown in Table VI:

TABLE VI

| Temperature °C. | L.S. % | L.O.I. % | Ksat % | H₂O abs. % | C.S. MPA |
|---|---|---|---|---|---|
| 1250 | 12.42 | 22.4 | 0.54 | 9.3 | 72.84 |

EXAMPLE 7

Results with 20% clay as binder.
The clay used contains 55% $SiO_2$, 20.5% $Al_2O_3$, 3.7% MgO, 6% alkalis, 5% $Fe_2O_3$. The loss on ignition is about 6% and total other elements is about 4%. The samples are made in the following manner:
raw material: −28 mesh uncalcined and non demagnetized binder: 20% clay
compacting pressure: 4000 psi
sintering time and temperature: 4 h at 1250° C.
Results are shown in Table VII:

TABLE VII

| Temperature °C. | L.S. % | L.O.I. % | Ksat % | H₂O abs. % | C.S. MPA |
|---|---|---|---|---|---|
| 1250 | 5.69 | 7.63 | 0.41 | 7.59 | 114.72 |

EXAMPLE 8

Fired units were prepared using asbestos tailings as mined and the iron depleted fractions from various asbestos mine along with a variety of binders and in various amounts. Each sample was pressed at 4000 psi and fired at 1250° C. for 4 hours. The results are shown in Table VIII:

TABLE VIII

Those samples were pressed at 4000 PSI and fired at 1250° C. for 4 hours.

| Location and particles size | Iron depleted fraction | | | | | | as mined | | | | | |
|---|---|---|---|---|---|---|---|---|---|---|---|---|
| | % Tailings | % Nephel* | % NaCl | Absorption water | Linear shrink | Color | % Tailings | % Nephel* | % NaCl | Absorption water | Linear shrink | Color |
| Lac d'amiante du Quebec Ltee Location R 2 -35 mesh | 100 | ∅ | ∅ | 11.0 | 7.6 | Buff | 100 | ∅ | ∅ | 11.0 | 6.7 | Dark buff |
| | 85 | 15 | ∅ | 7.5 | 6.7 | Buff | 85 | 15 | ∅ | 5.3 | 6.7 | Rusty brown |
| | 80 | 20 | ∅ | 3.7 | 6.9 | — | 80 | 20 | ∅ | 6.1 | 7.0 | — |
| | 75 | 25 | ∅ | 5.9 | 5.16 | Beige speckled | 75 | 25 | ∅ | 8.13 | 6.06 | — |
| | 98 | ∅ | 2 | 11.0 | 7.2 | Beige speckled | 98 | ∅ | 2 | 11.5 | 6.07 | Rusty |
| | 83 | 15 | 2 | 6.0 | 7.0 | Light grey | 83 | 15 | 2 | 4.3 | 6.5 | Rusty brown |
| | 78 | 20 | 2 | 1.7 | 6.5 | Grey | 78 | 20 | 2 | 2.5 | 6.1 | Grey brown |
| Bell Asbestos Ltee -28 mesh | | | | | | | 100 | ∅ | ∅ | 8.3 | 7.3 | Dark brown |
| " | | | | | | | 95 | 5 | ∅ | 5.6 | 7.4 | Dark brown |
| " | | | | | | | 93 | 5 | 2 | 1.3 | 6.9 | Brown |
| -200 mesh | | | | | | | 98 | ∅ | 2 | 0.05 | 11.1 | Dark brown |
| | | | | | | | 93 | 5 | 2 | 0.65 | 7.4 | Dark brown |
| Carey Canadian Inc. -48 mesh | 100 | ∅ | ∅ | 10.1 | 10.1 | Buff | 100 | ∅ | ∅ | 8.8 | 8.90 | Dark buff |
| Carey Canadian Inc. -48 mesh | 85 | 15 | ∅ | 6.3 | 9.9 | Grey with black speckles | 85 | 15 | ∅ | 4.8 | 9.86 | Rusty |
| Carey Canadian Inc. -48 mesh | 80 | 20 | ∅ | 5.1 | 8.9 | Light buff | 80 | 20 | ∅ | 5.7 | 8.15 | Rusty |
| Carey Candian Inc. -48 mesh | 75 | 25 | ∅ | 4.3 | 7.6 | Light beige | 75 | 28 | ∅ | 6.0 | 8.07 | Dark beige |
| Carey Canadian Inc. -48 mesh | 98 | ∅ | 2 | 9.5 | 9.23 | Off white speckled | 98 | ∅ | 2 | 8.5 | 9.23 | Dark buff |
| Carey Canadian Inc. -48 mesh | 83 | 15 | 2 | 4.9 | 9.43 | Off white speckled | 83 | 15 | 2 | 3.5 | 9.66 | Light ash |
| Carey Canadian Inc. -48 mesh | 78 | 20 | 2 | 1.95 | 8.50 | — | 78 | 20 | 2 | 1.40 | 8.52 | Rusty |
| Lac d'aminate du Quebec Ltee Location S 12 -35 mesh | 100 | ∅ | ∅ | 12.3 | 7.2 | Beige | 100 | ∅ | ∅ | 12.1 | 7.3 | Rusty |
| | 85 | 15 | ∅ | 7.7 | 6.7 | Buff | 85 | 15 | ∅ | 4.6 | 7.2 | Brown |
| | 80 | 20 | ∅ | 5.3 | 6.5 | — | 80 | 20 | ∅ | 3.7 | 7.6 | Brown |

TABLE VIII-continued

Those samples were pressed at 4000 PSI and fired at 1250° C. for 4 hours.

| Location and particules size | Iron depleted fraction | | | | | | as mined | | | | | |
|---|---|---|---|---|---|---|---|---|---|---|---|---|
| | % Tailings | % Nephel* | % NaCl | Absorption water | Linear shrink | Color | % Tailings | % Nephel* | % NaCl | Absorption water | Linear shrink | Color |
| | 75 | 25 | 0 | 2.9 | 5.4 | Buff | 75 | 25 | 0 | 4.3 | N/A | — |
| | 98 | 0 | 2 | 11.7 | 6.5 | Light buff | 98 | 0 | 2 | 11.05 | 6.7 | Rusty |
| | 83 | 15 | 2 | 5.5 | 7.6 | — | 83 | 15 | 2 | 4.1 | 8.1 | Brown |
| | 78 | 20 | 2 | 1.5 | 6.5 | Light beige | 78 | 20 | 2 | 1.8 | 5.4 | Dark brown |
| | 73 | 25 | 2 | 0.5 | 5.62 | — | 73 | 25 | 2 | 1.6 | 5.6 | Light brown |

*The term "nephel" used in Table VIII means nepheline syenite

What is claimed is:

1. A green moulded product unit suitable for firing, consisting essentially of:
   (a) at least 55% to 99% by weight of noncalcined asbestos tailings, the remainder consisting essentially of:
   (b) at least one
      (i) a metal chloride salt wherein the metal is selected from sodium, potassium, lithium, calcium, barium, magnesium, aluminum and mixtures thereof in an amount of from 1% to 15% by weight,
      (ii) a natural aluminum silicate in an amount of from 1% to 30% by weight, and
      (iii) mixtures of (i) and (ii).

2. A product of claim 1 including a natural aluminum salt and wherein the natural aluminum silicate is nepheline syenite.

3. The product of claim 1 including a heat decomposable metal salt and wherein the heat decomposable metal salt is sodium chloride.

4. The product of claim 1 including a heat decomposable metal salt and wherein the heat decomposable metal salt is calcium chloride.

5. The product of claim 1 including a heat decomposable metal salt and wherein the heat decomposable metal salt is magnesium chloride.

6. The product of claim 1 including (b)(i) but not (b)(ii).

7. The product of claim 1 including (b)(ii) but not (b)(i).

8. The product of claim 7 wherein (b)(ii) is nepheline syenite.

9. The product of claim 1 including a mixture of (b)(i) and (b)(ii).

* * * * *